(12) United States Patent
Zhou (10) Patent No.: US 11,108,890 B2
(45) Date of Patent: Aug. 31, 2021

(54) MANAGEMENT CLIENT AND DEVICE MONITORING

(71) Applicant: Advanced New Technologies Co., Ltd., Grand Cayman (KY)

(72) Inventor: Yixiao Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/805,320

(22) Filed: Feb. 28, 2020

(65) Prior Publication Data
US 2020/0329124 A1 Oct. 15, 2020

Related U.S. Application Data

(63) Continuation of application No. PCT/CN2020/071971, filed on Jan. 14, 2020.

(30) Foreign Application Priority Data

Apr. 10, 2019 (CN) .................. 201910283603.X (51) Int. Cl.
*H04L 29/06* (2006.01)
*H04L 29/08* (2006.01)
(Continued)

(52) U.S. Cl.
CPC .............. *H04L 67/42* (2013.01); *G16Y 30/00* (2020.01); *H04L 9/0825* (2013.01); *H04L 9/3247* (2013.01); *H04L 67/26* (2013.01)

(58) Field of Classification Search
CPC ....... H04L 67/26; H04L 67/42; H04L 9/0825; H04L 9/3247; G16Y 30/00
See application file for complete search history.

(56) References Cited

U.S. PATENT DOCUMENTS

| 10,891,282 | B1 * | 1/2021 | Willingham | ............ H04L 63/10 |
| 2014/0286354 | A1 * | 9/2014 | Van De Poel | ...... H04L 41/0273 |
| | | | | 370/463 |
| 2020/0067903 | A1 * | 2/2020 | Yegorin | .............. H04L 63/0807 |

FOREIGN PATENT DOCUMENTS

| CN | 101668031 | 3/2010 |
| CN | 103079176 | 5/2013 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.

(Continued)

*Primary Examiner* — Azizul Choudhury
(74) *Attorney, Agent, or Firm* — Fish & Richardson P.C.

(57) ABSTRACT

Implementations of the present specification disclose management clients, device monitoring systems, and methods. The device monitoring system includes the following: an intermediary, configured to send subscription information and receive publishing information; and a plurality of clients, communicatively connected to the intermediary and configured to send the corresponding publishing information based on the received subscription information, where the client includes at least one first client and at least one second client; the first client and the second client exchange information by using the intermediary; and the first client monitors the second client based on a device management protocol.

15 Claims, 5 Drawing Sheets

(51) Int. Cl.
  *G16Y 30/00*   (2020.01)
  *H04L 9/08*    (2006.01)
  *H04L 9/32*    (2006.01)

(56) References Cited

FOREIGN PATENT DOCUMENTS

| | | |
|---|---|---|
| CN | 104484735 | 4/2015 |
| CN | 105007303 | 10/2015 |
| CN | 106169967 | 11/2016 |
| CN | 106385410 | 2/2017 |
| CN | 107861703 | 3/2018 |
| CN | 108540554 | 9/2018 |
| CN | 109088723 | 12/2018 |
| CN | 109995873 | 7/2019 |
| WO | WO2018157916 | 9/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071971, dated Apr. 13, 2020, 186pages (with machine translation).

\* cited by examiner

Paragraph 0010

```
{
"seq": number,
"cmd": "clientStat",
"sign": string
}
```

Paragraph 0020

```
{
"res": {
"name": "AntGRuntime",
"version": string,
   "platform":
"linux"|"win32"|"darwin",
"appVersion": string,
   "appName": string
},
"code": 0|1
"ack": number
}
```

Paragraph 0030

```
{
"seq": number,
"cmd": "deviceStat",
"sign": string
}
```

Paragraph 0040

```
{
"res": {
"ip": string,
"mac": string,
"d|d": string,//Device ID
"memTotal|": number,//Unit: byte
"memAvailable": number, //Unit: byte
"diskTotal": {
[{
"diskLabel": string
"diskSize": number
}]
}, //Total size of each disk partition, unit: byte
   "diskAvailable": {
[{
"diskLabel": string
"diskSize": number
}]
}, //Total available size of each disk partition;
unit: byte
"cupUsage":  number,//Percentage, interval 0-1
"clientCupUsage": number,//Percentage,
interval 0-1
},
"code": 0|1
"ack": number
}
```

FIG. 4

Paragraph 0050
```
{
"seq": number,
"cmd": "pageReload",
"sign": string
}
```

Paragraph 0060
```
{
   "code": 0|1,
"ack": number
}
```

Paragraph 0070
```
{
"seq": number,
"cmd": "clientUpdate",
"sign": string
}
```

Paragraph 0080
```
{
   "code": 0|1|2,
"ack": number
}
```

Paragraph 0090
```
{
"seq": number,
"cmd": "uploadLog",
"sign": string
}
```

Paragraph 0100
```
{
   "code": 0|1,
"ack": number,
  "res": {
"fileId": string
  }
}
```

Paragraph 0110
```
{
"seq": number,
"cmd": "uploadScreenCapture",
"sign": string
}
```

Paragraph 0120
```
{
   "code": 0|1,
"ack": number,
  "res": {
"fileId": string
  }
}
```

MANAGEMENT CLIENT AND DEVICE MONITORING

CROSS-REFERENCE TO RELATED APPLICATIONS

This application is a continuation of PCT Application No. PCT/CN2020/071971, filed on Jan. 14, 2020, which claims priority to Chinese Patent Application No. 201910283603.X, filed on Apr. 10, 2019, and each application is hereby incorporated by reference in its entirety.

TECHNICAL FIELD

The present application relates to the field of Internet of Things and computer technologies, and in particular, to management clients and device monitoring systems and methods.

BACKGROUND

The revolution of the information industry has brought Internet of Things (IoT) technologies to people. IoT is a network that is based on information carriers such as the Internet and implements interworking of independently addressable ordinary objects. In short, IoT can implement data exchange between devices.

SUMMARY

Implementations of the present specification provide management clients, device monitoring systems and methods, to alleviate problems in existing technologies.

The following technical solutions are used in the implementations of the present specification:

An implementation of the present specification provides a device monitoring system, including the following: an intermediary, configured to send subscription information and receive publishing information; and a client, communicatively connected to the intermediary and configured to send the corresponding publishing information based on the received subscription information, where the client includes at least one first client and at least one second client; the first client and the second client exchange information by using the intermediary; and the first client monitors the second client based on a device management protocol.

Preferably, the subscription information includes an operation instruction for the client and/or data information associated with the client; and the publishing information includes data information that is obtained based on the operation instruction and associated with the client.

Preferably, the operation instruction includes a data acquisition instruction; the intermediary sends the data acquisition instruction to the client; and the client sends the data information associated with the client to the intermediary based on the data acquisition instruction, where the data information includes status information of the client.

Preferably, the intermediary sends an operation instruction to the first client, where the operation instruction includes data information associated with status information of the second client; and the first client performs an operation on the first client based on the operation instruction, and sends data information associated with the operation to the intermediary.

Preferably, the operation includes performing at least one of upgrade management, update management, log management, and screenshot management on the first client.

Preferably, the subscription information includes a key.

Preferably, the intermediary digitally signs the subscription information by using a private key corresponding to the client; and the client performs signature verification on the subscription information by using a public key.

Preferably, the intermediary is an agent based on the Message Queuing Telemetry Transport (MQTT) protocol or the Web Application Messaging Protocol (WAMP) protocol; and the second client is a large-screen device.

An implementation of the present specification provides a management client, where the management client is communicatively connected to an intermediary, and includes the following: a subscription module, configured to receive subscription information sent by the intermediary, where the subscription information includes an operation instruction and/or data information; and a publishing module, configured to send status information associated with the management client to the intermediary based on the operation instruction and/or the data information.

Preferably, the intermediary is further communicatively connected to at least one device client; and the data information includes status information associated with the device client.

Preferably, the device client includes the following: a subscription module, configured to receive a data acquisition instruction sent by the intermediary; and a publishing module, configured to send the status information of the device client to the intermediary based on the data acquisition instruction.

Preferably, the management client performs at least one of system upgrade, page refresh, log acquisition, and screenshot operation on the management client based on the operation instruction and/or the data information.

Preferably, the intermediary is an agent based on the MQTT protocol or the WAMP protocol; and the device client is a large-screen device.

An implementation of the present specification provides a device monitoring method, where data information that is associated with a device client and/or a management client and corresponds to a device management protocol is published/subscribed by using an intermediary, and the method includes the following: publishing/subscribing to status information of the device client and/or the management client; and publishing/subscribing to device monitoring information of the management client.

Preferably, the publishing/subscribing to device monitoring information of the management client further includes publishing/subscribing to at least one of system upgrade information, page refresh information, log information, and screenshot information of the management client.

Preferably, the data information includes a security key.

Preferably, the intermediary performs publishing/subscribing based on the MQTT protocol or the WAMP protocol; and the device client is a large-screen device.

The previous at least one technical solution used in the implementations of the present specification can achieve the following beneficial effects:

One or more implementations of the present specification provide the management clients, device monitoring systems, and methods. Message sending and receiving between the management client and the device client are performed by the intermediary, no additional special server and information forwarding are needed, and the management client monitors the device client based on the device management protocol, thereby reducing numerous research and development resources and costs, satisfying the demand for effective device management and control at low costs in the field of Internet of Things technologies, and facilitating promotion and use. In addition, the security key is added to the transmitted data, thereby ensuring communication security and effectively preventing malicious attacks or data interception.

BRIEF DESCRIPTION OF DRAWINGS

The accompanying drawings described here are intended to provide a further understanding of the present application, and constitute a part of the present application. The example implementations of the present application and the descriptions of the example implementations are intended to explain the present application, and do not constitute an undue limitation on the present application. In the drawings.

DESCRIPTION OF IMPLEMENTATIONS

Figure 1:
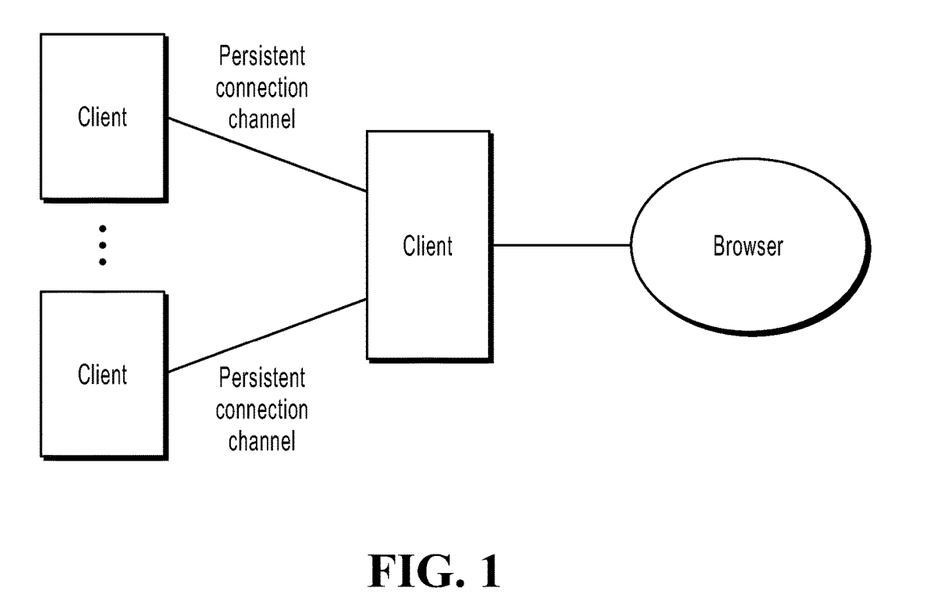
FIG. 1 is a schematic structural diagram illustrating a general Internet of Things platform, according to one or more implementations of the present specification.

The Internet of Things (IoT) device management platform is one hotspot of IoT technologies in recent years. Most commonly seen IoT device management platforms are based on the client-server (C/S) plus browser-server (B/S) architecture. FIG. 1 is a schematic structural diagram illustrating a general IoT platform, according to one or more implementations of the present specification. As shown in FIG. 1, on the IoT platform based on the C/S+B/S architecture, a specific client is deployed on an IoT device, so that the client can maintain a persistent connection message channel with a server. An administrator of the IoT device can log in to the server by using a browser and send various commands to the client for execution by using the persistent connection message channel between the server and the client. The client returns an execution result to the server, and the server then pushes the result to the browser.

In the research and development process of the previously described platform, at least three types of development resources need to be invested, i.e., client development (e.g., applications of the IoT device), server development, and front-end development (e.g., operation interfaces and information presentation for various functions of the server). When the server uses the architecture of a distributed cluster, a message middleware further needs to be developed to synchronize statuses of various server devices, which significantly increases the difficulty and resources of research and development. As a result, the IoT device management platform built by using the previously described method is highly costly, and is not easy to promote and widely use.

The field of large screen technologies is used as an example. With the development of commercialization, how to efficiently manage and control different large screens in different regions becomes an important challenge. Based on the industrialization characteristics of large screen technologies, using the IoT device management platform with a distributed cloud architecture usually leads to a serious waste of resources, costs, etc.

To alleviate the previously described problems, one or more implementations of the present specification provide management clients, device monitoring systems, and methods. An intermediary is used to implement direct communication between clients, thereby reducing numerous resources and costs, satisfying the demand for effective device management and control at low costs in the field of IoT technologies, and facilitating promotion and use.

To make the objectives, technical solutions, and advantages of the present application clearer, the following clearly describes the technical solutions of the present application with reference to specific implementations and accompanying drawings of the present application. Clearly, the described implementations are merely some rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

Figure 2:
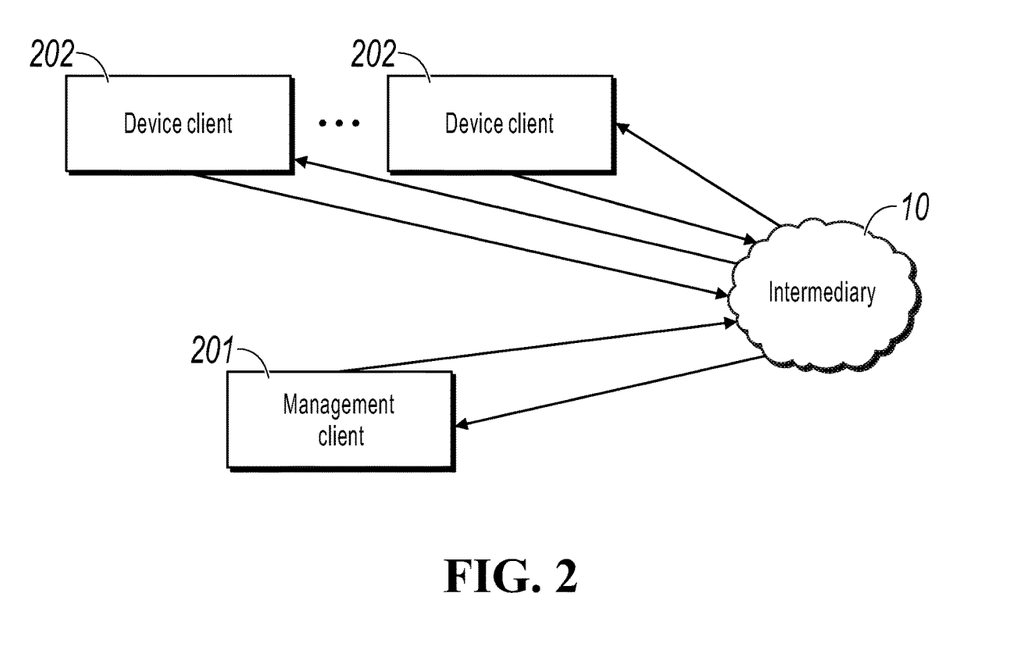
FIG. 2 is a schematic structural diagram illustrating a device monitoring system, according to one or more implementations of the present specification.

FIG. 2 is a schematic structural diagram illustrating a device monitoring system, according to one or more implementations of the present specification. As shown in FIG. 2, the monitoring system includes an intermediary and some clients communicatively connected to the intermediary. The intermediary is configured to send subscription information and receive publishing information. The client is configured to send the corresponding publishing information based on the received subscription information, and includes a publishing module and a subscription module. A monitoring system including one management client 201 and some device clients 202 is used as an example. Information is exchanged between the management client 201 and the device clients 202 by using an intermediary 10. The management client 201 monitors each device client 202 based on a device management protocol. Specific monitoring functions that can be implemented can be set by using a customized device management protocol.

Figure 3:
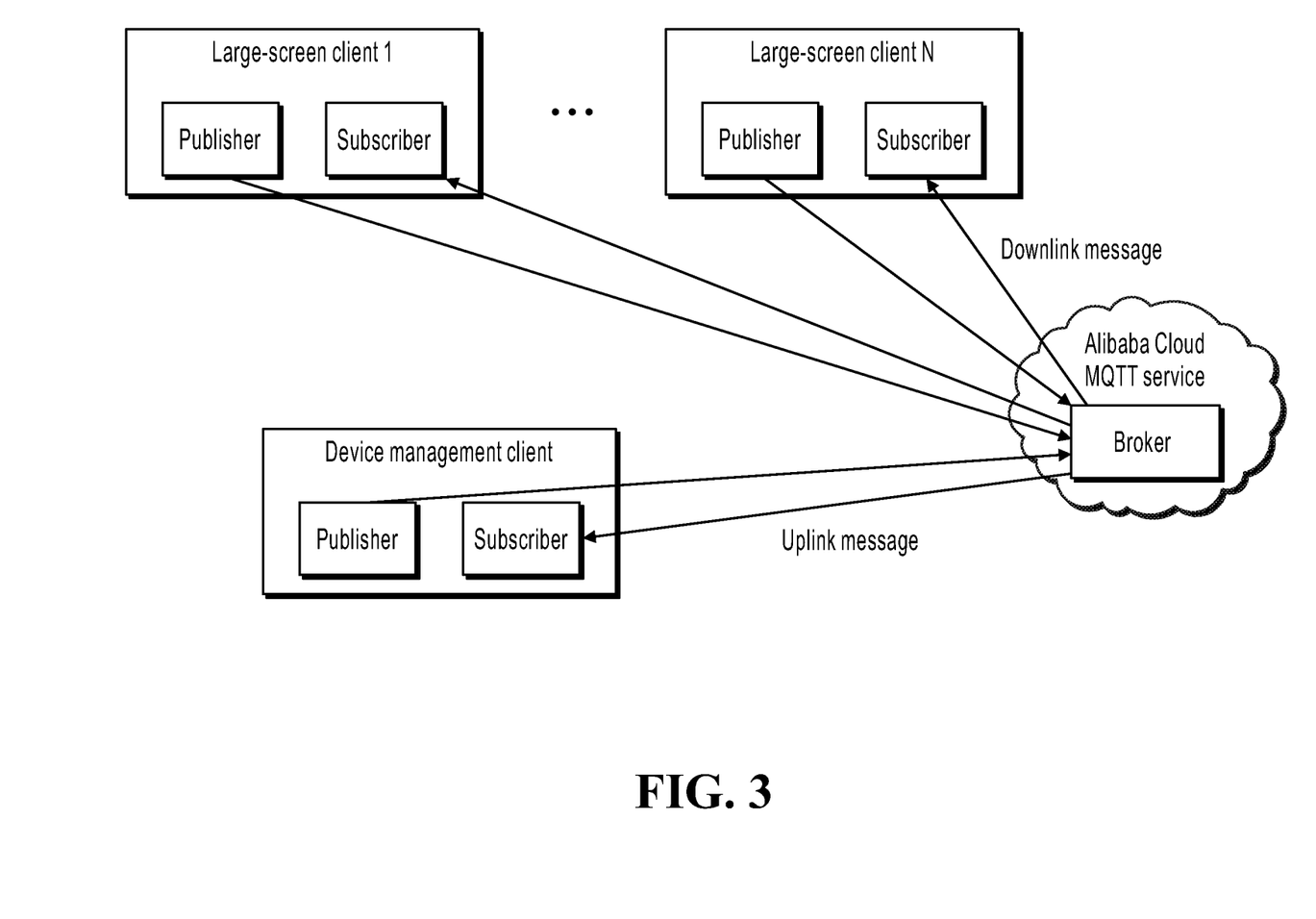
FIG. 3 is a schematic structural diagram illustrating a large-screen device monitoring system, according to one or more implementations of the present specification.

In one or more implementations, a large-screen device monitoring system is used as an example. FIG. 3 is a schematic structural diagram illustrating a large-screen device monitoring system, according to one or more implementations of the present specification. As shown in FIG. 3, the large-screen device monitoring system uses the Message Queuing Telemetry Transport (MQTT) protocol (or the Web Application Messaging Protocol (WAMP) protocol) to implement information communication between the large-screen client and the device management client. The device monitoring system includes the following: a broker (i.e., an intermediary), configured to forward publishing information/subscription information between the large-screen client and the device management client; one device management client and N large-screen clients that are communicatively connected to the broker. The device management client can manage and control the large-screen clients based on the large-screen device management protocol.

In one or more implementations, the MQTT protocol is a lightweight communication protocol based on the publish/ subscribe mode. The MQTT protocol is built on the TCP/IP protocol. The greatest advantage of MQTT is to provide real-time reliable messaging services for remote devices with minimal code and limited bandwidth. As a low-overhead and low-bandwidth instant messaging protocol, MQTT is widely used in the IoT field. Generally, the reference model of TCP/IP can be divided into four layers: an application layer, a transport layer, a network layer, and a link layer. The MQTT protocol runs on TCP and is an application layer protocol. Therefore, the MQTT protocol can be used in application scenarios that support the TCP/IP protocol stack.

In one or more implementations, a message format of an MQTT command is typically as follows:

Fixed Header|Variable Header|Payload

Here, Fixed Header represents a fixed packet header that generally includes at least two bytes, where the first byte can include flags such as the message type and the message QoS level; the second byte is the remaining length field, and the length indicates the total length of the following Variable Header and Payload; generally, the field can include a maximum of four bytes; Variable Header represents a variable packet header, which can include a protocol name, a protocol version, a connection flag, a heartbeat interval, a connection return code, a body name, etc.; Payload represents a payload, i.e., a message body; for example, when the type of the message sent by MQTT is CONNECT, PUBLISH, SUBSCRIBE, SUBACK, or UNSUBSCRIBE, the message carries a payload.

In one or more implementations, the Connect Flags included in the first byte of the fixed packet header (Fixed Header) of the MQTT protocol command can be used to distinguish the message types of MQTT. Generally, the MQTT protocol has more than ten different message types, such as connection and abortion, publishing and subscription, QoS 2 message mechanism, and various ACKs for acknowledgement.

In one or more implementations, the message quality of the MQTT protocol typically includes three levels: QoS 0, QoS 1, and QoS 2. QoS 0 is distributed at most once, and the message transmission depends on the underlying TCP/IP network, and there is no answer and retry specified in the protocol. In other words, the message either arrives at the server only once or does not arrive at the server at all. QoS 1 is distributed at least once, and the message receiving at the server will be acknowledged by using the PUBACK message. If a link or a transmitting device is abnormal during the communication, or no acknowledgement message is received within the specified time, the transmitter will resend the message with the DUP flag being set in the message header. QoS 2 is distributed only once, and as the highest level of message transmission, at the QoS 2 level, message loss or repetition is not accepted, but message transmission at the QoS 2 level will lead to additional overheads.

In one or more implementations, the publish/subscribe mode used by the MQTT protocol is an asynchronous mode. To be specific, there is no need to establish a direct connection between the client publishing a message (the publisher) and the client subscribing to a message (the subscriber). The publisher and the subscriber only need to correspond to the same intermediary (i.e., message agent), and the publisher and the subscriber do not need to interact directly or go online simultaneously. In addition, MQTT can further implement reverse control of different clients. For example, client 1 can subscribe to a certain topic, and when the publisher publishes a message for the topic, client 1 can further perform a series of corresponding operations after receiving the message.

In one or more implementations, the WAMP protocol is a network program message protocol and is an application layer protocol standard based on the WebSocket protocol. The WAMP protocol mainly provides the Remote Procedure Call (RPC) and Publish & Subscribe functions. The RPC function can be used to call a method registered with a remote client and return a method value. The calling procedure is visible to the user. Similar to the MQTT protocol, the publishing and subscribing function of the WAMP protocol also uses an intermediary (agent) to build a publishing-subscribing model. In the model, the publisher submits information to an abstract "topic" and the subscriber receives information indirectly based on the interest in the corresponding "topic". The publisher and the subscriber do not need to interact directly, but can be decoupled directly from the intermediary by using the "topic".

In one or more implementations, the previously described large-screen device management protocol can be in the JSON format. JSON is a JavaScript object markup language that is object-centric and can represent any supported types, including strings, numbers, objects, arrays, etc. The syntax rule of JSON is as follows: The object is represented as a key value pair; data is separated by commas; braces are used to save objects; square brackets are used to save arrays. The JSON format is simple and clear in hierarchy, easy to read and compile, and also easy for a machine to parse and generate, thereby effectively improving network transmission efficiency.

Figure 4:
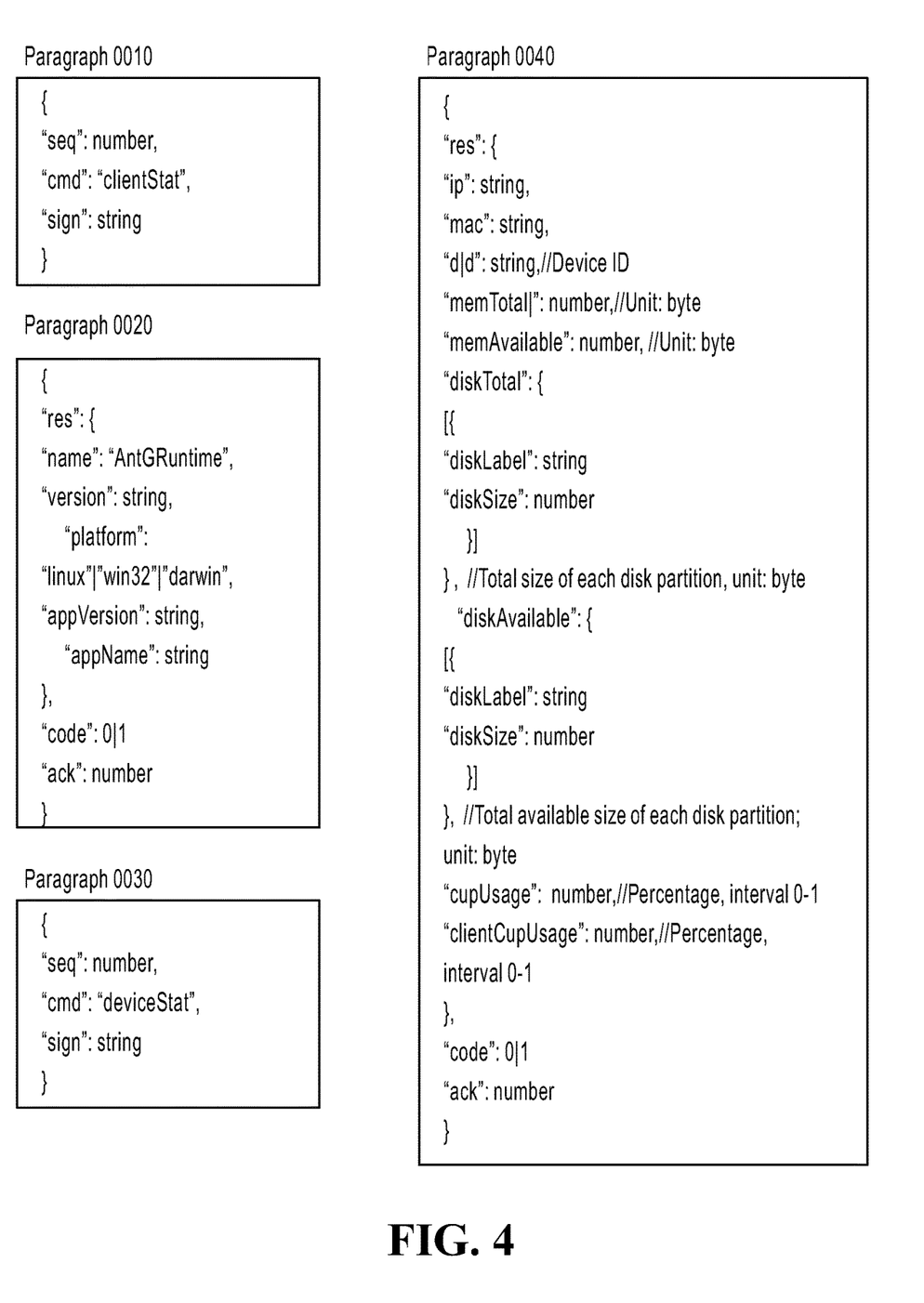
FIG. 4 is a schematic diagram 1 illustrating a device management protocol, according to one or more implementations of the present specification.
Figure 5:
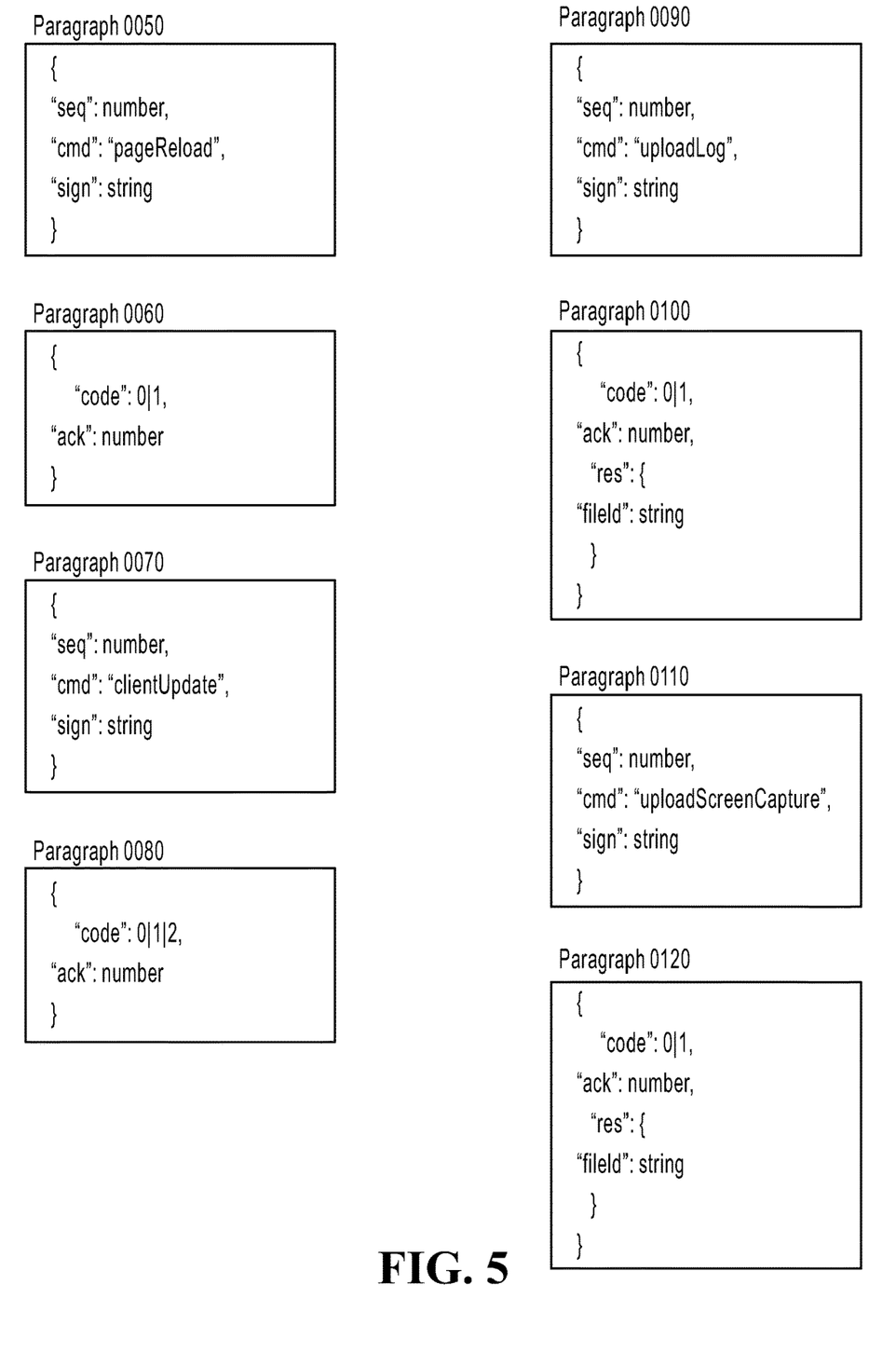
FIG. 5 is a schematic diagram 2 illustrating a device management protocol, according to one or more implementations of the present specification.

FIG. 4 and FIG. 5 are schematic diagrams of a device management protocol, according to one or more implementations of the present specification. As shown in FIG. 4 and FIG. 5, based on the protocol, a device management client and a large-screen client can implement the following information exchange by using an intermediary.

The intermediary sends subscription information to the device management client, where the subscription information includes an operation instruction for obtaining the status information of the device management client. The device management client publishes information to the intermediary based on the operation instruction, where the published information includes the status information of the device management client.

For example, paragraph 0010 in FIG. 4 shows JSON data sent by the intermediary.

Here, seq represents a command sequence number, generally in an auto-increment format, such as 1, 2, 3; cmd represents a command name, that is, the name of the command for obtaining the status of the device management client is clientStat; sign represents a data signature.

Correspondingly, paragraph 0020 in FIG. 4 shows JSON data returned by the device management client.

Here, res represents the returned data content, where name represents the client name, e.g., AntGRuntime by default; version represents the client version, e.g., 0.0.1; platform represents the used platform, e.g., Linux, Win32, Darwin; appVersion represents the name of the APP running on the device management client, and appName represents the version of the APP running on the client; code indicates whether there is an error in the return, for example, 0 indicates success and 1 indicates failure; ack indicates that the returned JSON data corresponds to the specified seq sent by the intermediary.

In one or more implementations, the same device management client can run multiple different APPs. For example, different APPs satisfying actual demands can be developed for different large-screen project application scenarios. By using the previously described returned data format in the device management protocol, different APPs can be used on the same device management client to manage and control the corresponding large-screen devices simultaneously, facilitating the operation and reducing the costs.

The intermediary sends subscription information to the large-screen client, where the subscription information includes an operation instruction for obtaining the status information of the large-screen client. The large-screen client publishes information to the intermediary based on the operation instruction, where the published information includes the status information of the large-screen client.

For example, paragraph 0030 in FIG. 4 shows JSON data sent by the intermediary.

Here, seq represents a command sequence number, generally in an auto-increment format, such as 1, 2, 3; cmd represents a command name, that is, the name of the command for obtaining the status of the large-screen client is deviceStat; sign represents a data signature.

Correspondingly, paragraph 0040 in FIG. 4 shows JSON data returned by the large-screen client.

Here, res represents the returned data content, where ip represents an IP address of the large-screen device, mac represents a MAC address of the large-screen device, dId represents an ID of the large-screen device (for example, the ID can be generated by using MAC+6 as a random number), memTotal represents the total memory of the large-screen device, memAvailable represents the available memory of the large-screen device, diskTotal represents the total disk space of the large-screen device, diskAvailable represents the available space of the large-screen device, cupUsage represents the CPU usage of the large-screen device, and clientCupUsage represents the CPU usage occupied by the large-screen client.

The intermediary sends subscription information to the device management client, where the subscription information includes an operation instruction for refreshing the page information of the device client. The device management client performs page refreshing based on the operation instruction, and returns, to the intermediary, a result indicating whether the refreshing is successful as the published information.

For example, paragraph 0050 in FIG. 5 shows JSON data sent by the intermediary.

Here, seq represents a command sequence number, generally in an auto-increment format, such as 1, 2, 3; cmd represents a command name, that is, the name of the command for refreshing the page of the device client is pageReload; sign represents a data signature.

Correspondingly, paragraph 0060 in FIG. 5 shows JSON data returned by the device management client.

Here, code indicates whether the page refreshing is successful, for example, 0 indicates success and 1 indicates failure; ack indicates that the returned JSON data corresponds to the specified seq sent by the intermediary.

The intermediary sends subscription information to the device management client, where the subscription information includes an operation instruction for upgrading the version of the device client. The device management client performs version upgrade based on the operation instruction, and returns, to the intermediary, a result indicating whether the upgrade is successful as the published information.

For example, paragraph 0070 in FIG. 5 shows JSON data sent by the intermediary.

Here, seq represents a command sequence number, generally in an auto-increment format, such as 1, 2, 3; cmd represents a command name, that is, the name of the command for upgrading the device client is clientUpdate; sign represents a data signature.

Correspondingly, paragraph 0080 in FIG. 5 shows JSON data returned by the device management client.

Here, code indicates whether the upgrade is successful, for example, 0 indicates success, 1 indicates failure, and 2 indicates that the current version is the latest; ack indicates that the returned JSON data corresponds to the specified seq sent by the intermediary.

The intermediary sends subscription information to the device management client, where the subscription information includes an operation instruction for obtaining the log information of the device client. The device management client obtains the log based on the operation instruction, and returns, to the intermediary, information associated with the log obtaining as the published information.

For example, paragraph 0090 in FIG. 5 shows JSON data sent by the intermediary.

Here, seq represents a command sequence number, generally in an auto-increment format, such as 1, 2, 3; cmd represents a command name, that is, the name of the command for obtaining the log information of the device client is uploadLog; sign represents a data signature.

Correspondingly, paragraph 0100 in FIG. 5 shows JSON data returned by the device management client.

Here, code indicates whether the obtaining is successful, for example, 0 indicates success and 1 indicates failure; ack indicates that the returned JSON data corresponds to the specified seq sent by the intermediary; res represents the returned data content, for example, when the Alibaba Cloud OSS service is used; fileId represents an ID of the obtained log file in cloud storage.

The intermediary sends subscription information to the device management client, where the subscription information includes an operation instruction for obtaining the screenshot information of the device client. The device management client performs a screenshot operation based on the operation instruction, and returns, to the intermediary, information associated with the screenshot obtaining as the published information.

For example, paragraph 0110 in FIG. 5 shows JSON data sent by the intermediary.

Here, seq represents a command sequence number, generally in an auto-increment format, such as 1, 2, 3; cmd represents a command name, that is, the name of the command for obtaining the screenshot information of the device client is uploadScreenCapture; sign represents a data signature.

Correspondingly, paragraph 0120 in FIG. 5 shows JSON data returned by the device management client.

Here, code indicates whether the obtaining is successful, for example, 0 indicates success and 1 indicates failure; ack indicates that the returned JSON data corresponds to the specified seq sent by the intermediary; res represents the returned data content, for example, when the Alibaba Cloud OSS service is used; fileId represents an ID of the obtained screenshot file in cloud storage.

Figure 6:
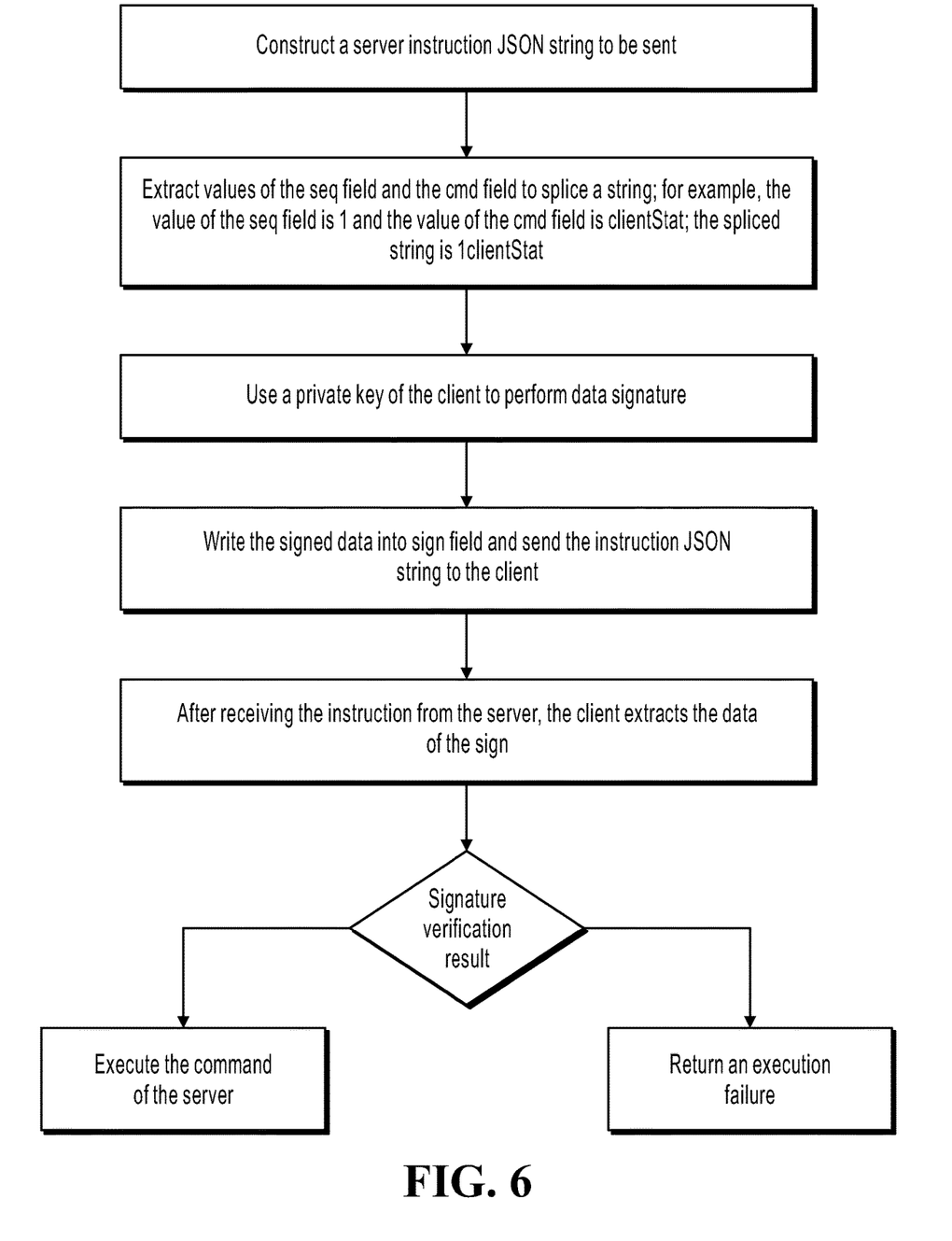
FIG. 6 is a flowchart illustrating a secure data transmission method, according to one or more implementations of the present specification.

In one or more implementations, to improve the communication security of the device management system and prevent a third-party server from sending malicious instructions to attack or steal client data, a key can be added to data to improve the transmission security. FIG. 6 is a flowchart illustrating a secure data transmission method, according to one or more implementations of the present specification. As shown in FIG. 6, the method includes the following:

First, an operation instruction JSON string sent by an intermediary is constructed. The seq field and the cmd field are extracted to splice a string. For example, the value of the seq field is 1 and the value of the cmd field is clientStat. Then, the spliced string is 1clientStat.

Next, a private key of the client (for example, a private key of the device management client or a private key of the large-screen client) is used to perform data signature. The signed data is written into the sign field and the obtained operation instruction JSON string is sent to the client.

Finally, after receiving the operation instruction sent by the intermediary, the client extracts the sign field and verifies the signature by using a public key. If the verification succeeds, the client executes the operation instruction, and otherwise, returns information indicating execution failure.

In one or more implementations, the present specification further provides a device monitoring method, where data information that is associated with a device client and/or a management client and corresponds to a device management protocol is published/subscribed by using an intermediary, and the method includes the following: publishing/subscribing to status information of the device client and/or the management client; and publishing/subscribing to device monitoring information of the management client.

In one or more implementations, the publishing/subscribing to device monitoring information of the management client further includes publishing/subscribing to at least one of system upgrade information, page refresh information, log information, and screenshot information of the management client.

In one or more implementations, the data information includes a security key.

In one or more implementations, the intermediary performs publishing/subscribing based on the MQTT protocol or the WAMP protocol; and the device client is a large-screen device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the previous apparatus is described by dividing functions into various units. Certainly, when the present application is implemented, a function of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of executable computer instructions executed by a computer, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented system, comprising:
an intermediary and a plurality of clients communicatively connected to the intermediary, wherein the intermediary is configured to:
send, to the plurality of clients as a first step of a device management protocol, subscription information comprising a data acquisition instruction; and
receive, from the plurality of clients as a second step of the device management protocol, publishing information comprising status information of the plurality of clients based on the plurality of clients receiving the data acquisition instruction; and
wherein the plurality of clients are configured to:
send the publishing information based on the subscription information, wherein the plurality of clients comprise at least one first client and at least one second client, and wherein the first client and the second client exchange information by using the intermediary; and the first client monitors the second client based on the device management protocol.

2. The computer-implemented system of claim 1, wherein the intermediary sends an operation instruction to the first client, wherein the operation instruction comprises data information associated with status information of the second client; and the first client performs an operation on the first client based on the operation instruction, and sends data information associated with the operation to the intermediary.

3. The computer-implemented system of claim 2, wherein the operation comprises performing at least one of upgrade management, update management, log management, and screenshot management on the first client.

4. The computer-implemented system of claim 1, wherein the subscription information comprises a key.

5. The computer-implemented system of claim 4, wherein the intermediary digitally signs the subscription information by using a private key corresponding to a particular client of the plurality of clients; and the particular client performs signature verification on the subscription information by using a public key.

6. The computer-implemented system of claim 1, wherein the intermediary is an agent based on Message Queuing Telemetry Transport (MQTT) protocol or Web Application Messaging Protocol (WAMP) protocol; and the second client is a device equipped with a screen.

7. The computer-implemented system of claim 1, wherein the status information of the plurality of clients comprises an indication of available memory on a particular client of the plurality of clients.

8. A computer-implemented method comprising:
    sending, by an intermediary communicatively connected to a plurality of clients, subscription information comprising a data acquisition instruction to the plurality of clients as a first step of a device management protocol, wherein the plurality of clients comprises at least one first client and at least one second client;
    receiving, by the intermediary from the plurality of clients, as a second step of the device management protocol, publishing information comprising status information of the plurality of clients based on the plurality of clients receiving the data acquisition instruction; and
    providing data to the first client wherein the first client monitors the second client based on the data and the device management protocol.

9. The computer-implemented method of claim 8, wherein the data comprises at least one of system upgrade information, page refresh information, log information, and screenshot information.

10. The computer-implemented method of claim 8, wherein the subscription information, the publishing information, or the data comprise a security key.

11. The computer-implemented method of claim 8, wherein the intermediary performs data transfer of the subscription information, the publishing information, or the data based on MQTT protocol or WAMP protocol; and the second client is a device equipped with a screen.

12. A non-transitory, computer-readable medium storing one or more instructions executable by a computer system to perform operations comprising:
    sending, by an intermediary communicatively connected to a plurality of clients, subscription information comprising a data acquisition instruction to the plurality of clients as a first step of a device management protocol, wherein the plurality of clients comprise at least one first client and at least one second client;
    receiving, by the intermediary from the plurality of clients, as a second step of the device management protocol, publishing information comprising status information of the plurality of clients based on the plurality of clients receiving the data acquisition instruction; and
    providing data to the first client wherein the first client monitors the second client based on the data and the device management protocol.

13. The non-transitory, computer-readable medium of claim 12, wherein the data comprises at least one of system upgrade information, page refresh information, log information, and screenshot information.

14. The non-transitory, computer-readable medium of claim 12, wherein the subscription information, the publishing information, or the data comprise a security key.

15. The non-transitory, computer-readable medium of claim 12, wherein the intermediary performs data transfer of the subscription information, the publishing information, or the data based on MQTT protocol or WAMP protocol; and the second client is a device equipped with a screen.

* * * * *